2 Sheets—Sheet 1.
H. TONGUE.
STEAM ENGINE.
No. 11,796. Patented Oct. 10, 1854.
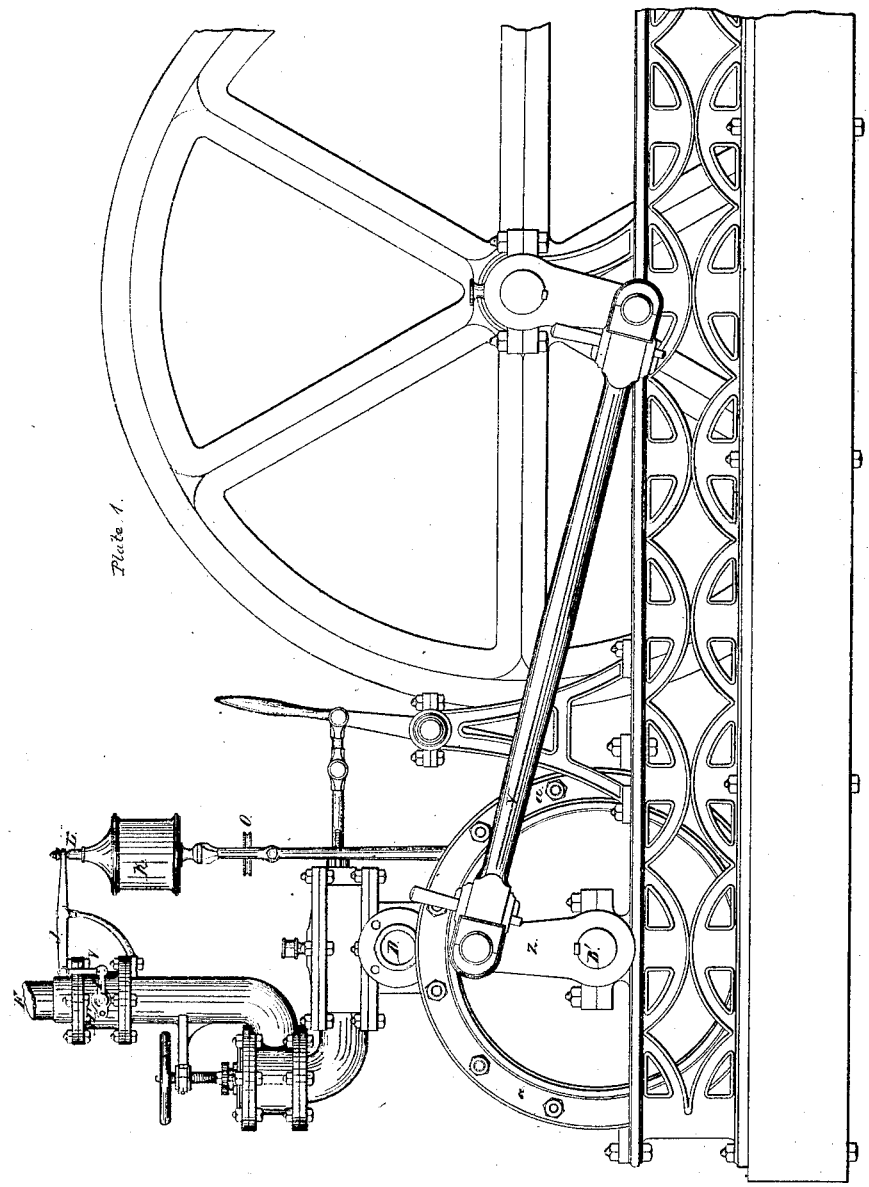
Inventor:
Henry Tongue H. TONGUE.
STEAM ENGINE.
No. 11,796. Patented Oct. 10, 1854.
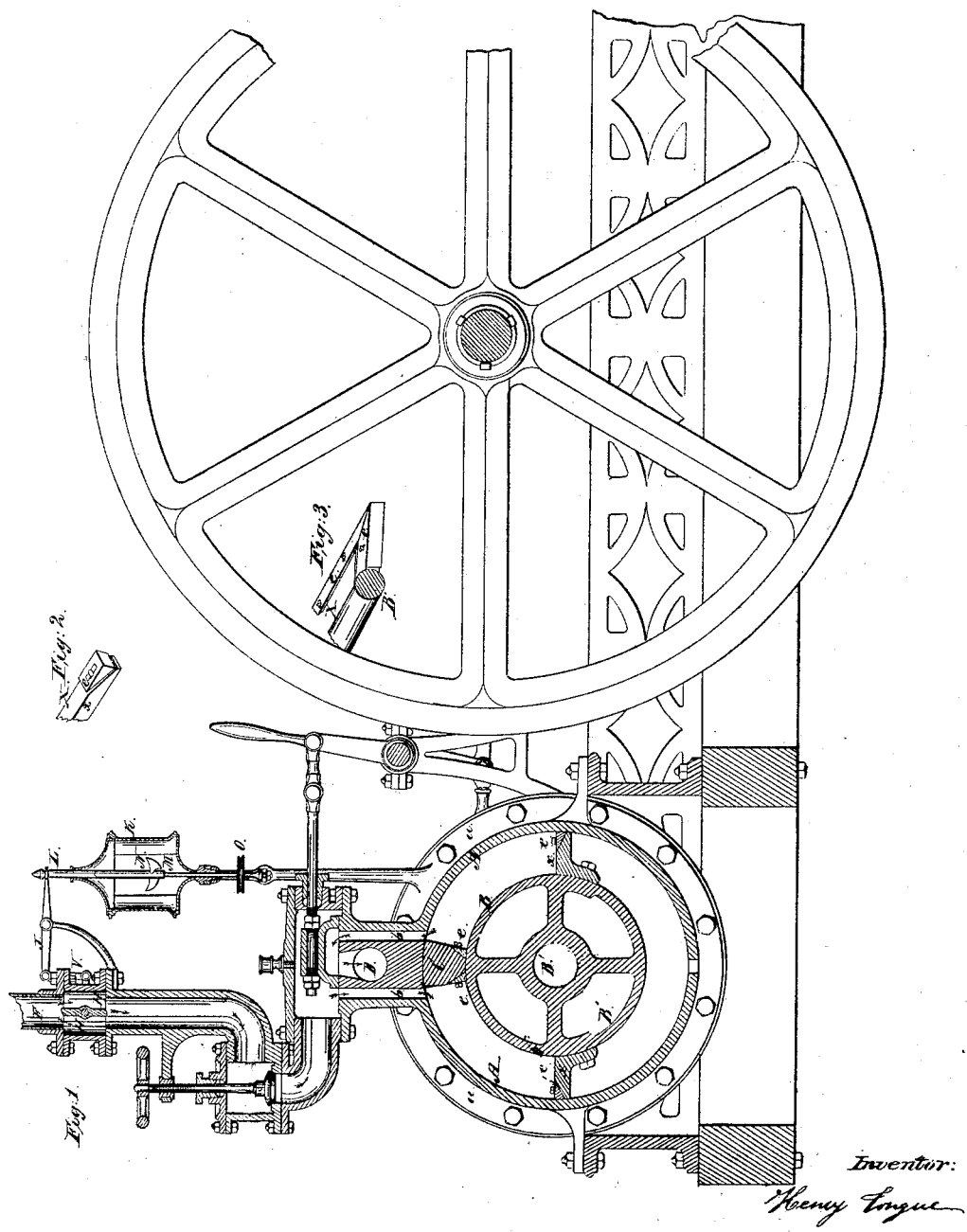
Inventor:
Henry Tongue

UNITED STATES PATENT OFFICE.

HENRY TONGUE, OF NASHVILLE, TENNESSEE.

STEAM-ENGINE.

Specification of Letters Patent No. 11,796, dated October 10, 1854.

*To all whom it may concern:*

Be it known that I, HENRY TONGUE, of Nashville, in the county of Davidson and State of Tennessee, have invented certain new and useful Improvements in Rotary Steam-Engines and the Mode of Governing the Same; and I do hereby declare that the following is a full, clear, and exact description of the same, reference being had to the accompanying drawings, making a part of this specification, in which—

Plate 1, exhibits the external view of the engine and Plate 2, a section thereof through the center.

This engine should strictly be termed a semi rotary, as the piston only makes a half revolution.

The nature of the improvement consists in so forming the projections on the piston, that when acted on by the pressure of the entering steam they have a portion like a wedge that slides down an inclined plane on the ends of said projections, and are thus kept steam tight when descending, but when ascending they have the property of being slightly loosened, thus obviating one half the friction consequent to fixed pistons. With the view of perfectly regulating the admission of steam I have made the governor to operate upon the principle of the screw in a cylindrical vessel containing water.

The description is as follows. A, A is the cylinder, furnished with a suitable flanch $a, a$, for securing the heads of the cylinders; B, the half rotating piston moving the shaft B′, on which the crank Z, is keyed; Y, a pitman connecting the crank with the balance wheel, &c.

C is a fixed and solid stop united to the cylinder. It is against this, that the piston B alternately strikes. The upper part forms the ports $b\ b$ and slide valve seat.

D, is the exhaust chamber to which the escape pipe is attached, at the lower sides of C, the metal is removed, so that inclined planes are formed, for the reception of the triangular packing of metal $e, e$. Upon the projections X X of the piston are similar metallic packings $e, e$. These triangles have a slot perforation extending partially from the base to the apex through which a bolt passes and on which they have the sliding movement on the planes of X X, and on C.

F is the steam induction pipe, H the butterfly valve therein turning on its shaft H′; I a crank on H′; V, a connecting rod between the crank and lever J, of the governor, which is a cylindrical vessel K, furnished with four ribs attached to its sides.

L is a hollow sleeve or tube fitting on and resting upon the top of the spindle (M). The lower end of L is provided with a helix or screw N.

O, is pulley on the spindle M and by cord or belt connected with the running portion of the engine may receive motion: the spindle passes through a suitable water tight stuffing box. There are other parts delineated common to an engine such as slide valve gear, throttle valve, &c., &c.

With the view of also securing the joint on the ends of the piston steam tight with the heads of the cylinder, I have placed similar planes on X (see Fig. 3) at right angles to those described: the packings the same as $e$ viz with a slot as shown in Fig. 2, in the packing or as an equivalent there may be a slot in the arm X: in this way the packing secures the piston on the heads, and more perfectly renders the piston steam tight without materially increasing the friction.

The operation is as follows: Steam entering by one of the ports $b$ in the direction of the downward darts, depresses the arm X on the left of the figure, and as the packing $e$, is free to slide downward and outward, a perfect joint is made with that side of the cylinder; a tight joint is made on the right hand side of the stop C, and the ring of the piston B B, by the packing $e$ at that point. The opposite packing—viz., on the projection to the right of the cylinder as it rises toward C—slides slightly on the incline on X and relieves the friction consequent to close fitting, the same remark equally applies to the left hand packing on the stop C: the exhaust steam rises through the right hand port in the direction of the darts into D and escapes. The motion is governed by opening or closing the butterfly valve H in the following manner: Water having been introduced into K nearly filling it, when the screw therein is turned, it has a tendency to rise in the water of said vessel, on the same principle as the screw propeller with the difference that in one case the movement is horizontal, in my application it is vertical, this movement raises the rod or sleeve L and closes the valve H by the lever J and rod V, thus shutting off the steam. The object of the ribs in the vessel K is to prevent the water therein flowing around in circles as these ribs produce eddies and thus break it up and offer greater resistance to the screw N. The governor as before described I design making the subject of another application.

Having described my improvement what I claim as my invention and desire to secure by Letters Patent is—

Constructing the piston B of a semi rotary engine with sliding metallic packings *e e*, in combination with the stop C, and cylinder A A, substantially in the manner set forth and for the purposes described in the foregoing specification.

In testimony whereof I have hereunto signed my name before two subscribing witnesses.

HENRY TONGUE.

Witnesses:
 JOHN F. CLARK,
 SAML. GRUBB.